(12) United States Patent
Fujita

(10) Patent No.: US 10,137,739 B2
(45) Date of Patent: Nov. 27, 2018

(54) PNEUMATIC TIRE

(75) Inventor: Shungo Fujita, Kodaira (JP)

(73) Assignee: BRIDGESTONE CORPORATION, Chuo-Ku, Tokyo (JP)

( * ) Notice: Subject to any disclaimer, the term of this patent is extended or adjusted under 35 U.S.C. 154(b) by 574 days.

(21) Appl. No.: 14/007,860

(22) PCT Filed: Mar. 28, 2012

(86) PCT No.: PCT/JP2012/058193
§ 371 (c)(1),
(2), (4) Date: Sep. 26, 2013

(87) PCT Pub. No.: WO2012/133559
PCT Pub. Date: Oct. 4, 2012

(65) Prior Publication Data
US 2014/0020803 A1    Jan. 23, 2014

(30) Foreign Application Priority Data
Mar. 28, 2011    (JP) .................. 2011-070863

(51) Int. Cl.
*B60C 11/03* (2006.01)
*B60C 11/12* (2006.01)
*B60C 11/11* (2006.01)

(52) U.S. Cl.
CPC .......... *B60C 11/03* (2013.01); *B60C 11/0302* (2013.01); *B60C 11/11* (2013.01);
(Continued)

(58) Field of Classification Search
CPC ..... B60C 11/0302; B60C 11/11; B60C 11/03; B60C 11/12; B60C 2011/0381;
(Continued)

(56) References Cited

U.S. PATENT DOCUMENTS

| 4,832,099 A | * | 5/1989 | Matsumoto ......... B60C 11/0302 |
| | | | 152/209.23 |
| 6,003,574 A | * | 12/1999 | Boiocchi ................. B60C 11/03 |
| | | | 152/209.1 |
| 6,129,127 A | * | 10/2000 | Nicotina ............. B60C 11/0306 |
| | | | 152/209.1 |

FOREIGN PATENT DOCUMENTS

| CN | 1158795 A | 9/1997 |
| EP | 0841198 A1 | 5/1998 |

(Continued)

OTHER PUBLICATIONS

Machine translation of JP05-319023 (no date).*
(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

An object is to enhance traction performance on snowy road surfaces while suppressing a drop in braking performance and handling stability performance on dry road surfaces and icy road surfaces.
A tread (12) includes first auxiliary grooves (21) formed on one groove width direction side of lug grooves (18, the first auxiliary grooves (21) opening onto the lug grooves (18) and terminating inside central land portion rows (16) (land portions), and second auxiliary grooves (22) formed on the other groove width direction side of the lug grooves (18), the second auxiliary grooves (22) opening onto the lug grooves (18) so as to face opening portions (21A) of the first auxiliary grooves (21) that open onto the lug grooves (18), and terminating inside the central land portion rows (16) (land portions).

5 Claims, 2 Drawing Sheets

(52) U.S. Cl.
CPC .......... B60C 11/1236 (2013.01); *B60C 11/12* (2013.01); *B60C 2011/0344* (2013.01); *B60C 2011/0372* (2013.01); *B60C 2011/0374* (2013.01); *B60C 2011/0381* (2013.01); *B60C 2011/1209* (2013.01); *B60C 2011/1213* (2013.01)

(58) Field of Classification Search
CPC ..... B60C 2011/0358; B60C 2011/0365; B60C 2011/0372; B60C 2011/0374; B60C 2011/0376; B60C 2011/0379; B60C 2011/0344; B60C 2011/1209; B60C 2011/1213
See application file for complete search history.

(56) References Cited

FOREIGN PATENT DOCUMENTS

| EP | 2450199 A2 | 5/2012 |
|---|---|---|
| JP | 4-274907 A | 9/1992 |
| JP | 5-319023 A | 12/1993 |
| JP | 11-91317 A | 4/1999 |
| JP | 2004-306906 A | 11/2004 |
| JP | 2006-248090 A | 9/2006 |
| JP | 4283783 B2 | 6/2009 |

OTHER PUBLICATIONS

Communication dated May 4, 2015 from the European Patent Office in counterpart application No. 12765848.2.
International Search Report of PCT/JP2012/058193, dated Jun. 5, 2012.

* cited by examiner

PNEUMATIC TIRE

CROSS REFERENCE TO RELATED APPLICATIONS

This application is a National Stage of International Application No. PCT/JP2012/058193 filed Mar. 28, 2012, claiming priority based on Japanese Patent Application No. 2011-070863, filed Mar. 28, 2011, the contents of all of which are incorporated herein by reference in their entirety.

TECHNICAL FIELD

The present invention relates to a pneumatic tire.

BACKGROUND ART

The following are examples of documents relating to pneumatic tires in which consideration is given to on-snow performance (see Patent Document 1 and Patent Document 2).

Patent Document 1: Japanese Patent No. 4283783
Patent Document 2: Japanese Patent Application Laid-Open (JP-A) No. 2004-306906

SUMMARY OF INVENTION

Technical Problem

In a known technique, in a tread pattern formed with plural land portion rows on a tire tread face portion, the land portion rows are provided with lug grooves that divide the land portion rows, and auxiliary grooves are formed to the land portion rows in order to enhance traction performance on snow. Forming such auxiliary grooves in the tire width direction is effective in the generation of traction during braking or acceleration on snow. Forming such auxiliary grooves in the tire circumferential direction is effective in securing handling stability performance on snow.

However, it is conceivable that when simply providing auxiliary grooves, this could incur a drop in block rigidity, and an accompanying drop in block edge pressure and an accompanying drop in the edge pressure of sipes formed to the blocks. There is a concern that this could affect braking performance and handling stability performance on dry road surfaces and icy road surfaces.

In consideration of the above circumstances, an object of the present invention is to enhance traction performance on snowy road surfaces whilst suppressing a drop in braking performance and handling stability performance on dry road surfaces and on icy road surfaces.

Solution to Problem

A first aspect of the present invention is a pneumatic tire with a tread, the tread including: plural circumferential direction main grooves extending along a tire circumferential direction; plural land portion rows that are partitioned by the circumferential direction main grooves; lug grooves that partition each land portion row into plural land portions in a row along the tire circumferential direction; first auxiliary grooves formed on one groove width direction side of the lug grooves, the first auxiliary grooves opening onto the lug grooves and terminating inside the land portions; and second auxiliary grooves formed on the other groove width direction side of the lug grooves, the second auxiliary grooves opening onto the lug grooves so as to face portions of the first auxiliary grooves that open onto the lug grooves, and terminating inside the land portions.

In the pneumatic tire according to the first aspect, in addition to the edge effect from the first auxiliary grooves and the second auxiliary grooves, snow that has been pushed out from the first auxiliary grooves and the second auxiliary grooves into the lug grooves is pushed together and compacted in the vicinity of the opening portions of the first auxiliary grooves and the second auxiliary grooves onto the lug grooves. Shear force from snow columns is accordingly increased, thereby enabling enhanced traction performance on snowy road surfaces.

Moreover, the lug grooves, the first auxiliary grooves and the second auxiliary grooves are respectively configured with different angles to each other, thereby enabling an edge effect that accommodates changes in input to the tire during turning to be realized, thus enabling a drop in braking performance and handing stability performance on dry road surfaces and icy road surfaces to be suppressed.

A second aspect of the present invention is the pneumatic tire of the first aspect, wherein an incline of the first auxiliary grooves forms an acute angle of less than 30 degrees with respect to a tire equatorial plane, and an incline of the second auxiliary grooves forms an acute angle of 30 degrees or greater with respect to the tire equatorial plane.

Note that the incline of the first auxiliary grooves with respect to the tire equatorial plane is configured as an acute angle of less than 30 degrees since above this value, the edge effect with respect to tire equatorial-orthogonal direction input that occurs during turning becomes insufficient. The incline of the second auxiliary grooves with respect to the tire equatorial plane is configured as an acute angle of 30 degrees or greater since below this value, the edge effect with respect to input along the tire equatorial direction that occurs during braking and during acceleration becomes insufficient.

In the pneumatic tire according to the second aspect, due to appropriately setting the angle of inclination of the first auxiliary grooves and the second auxiliary grooves that form an acute angle with respect to the tire equatorial plane, handling stability performance and an edge effect during braking and acceleration can be obtained when running on snowy road surfaces. Snow running performance can accordingly be further enhanced.

A third aspect is the pneumatic tire of the first aspect or the second aspect, wherein: a rotation direction is stipulated; the first auxiliary grooves are positioned towards the rotation direction rear; and the second auxiliary grooves are positioned towards the rotation direction front.

In the pneumatic tire according to the third aspect, any drop in land portion rigidity in the tire circumferential direction can be suppressed to a minimum. Acceleration and braking performance can accordingly be enhanced.

A fourth aspect is the pneumatic tire of any one of the first aspect to the third aspect, wherein a groove width of the second auxiliary grooves is greater than a groove width of the first auxiliary grooves.

In the pneumatic tire according to the fourth aspect, a large quantity of snow can be collected whilst still suppressing any drop in land portion rigidity to a minimum. Strong snow columns can thereby be formed along the tire circumferential direction, enabling the traction performance on snow to be further enhanced. Acceleration and braking performance on ice and snow can accordingly be enhanced.

Advantageous Effects of Invention

As described above, the pneumatic tire of the first aspect of the present invention obtains the excellent advantageous effect of enabling traction performance on snowy road surfaces to be enhanced, whilst suppressing any drop in braking performance and handling stability performance on dry road surfaces and icy road surfaces.

According to the pneumatic tire of the second aspect, the excellent advantageous effect is obtained of enabling snow running performance to be further enhanced.

According to the pneumatic tire of the third aspect, the excellent advantageous effect is obtained of enabling acceleration and braking performance to be enhanced.

According to the pneumatic tire of the fourth aspect, the excellent advantageous effect is obtained of enabling acceleration and braking performance on ice and snow to be enhanced.

DESCRIPTION OF EMBODIMENTS

Figure 1:
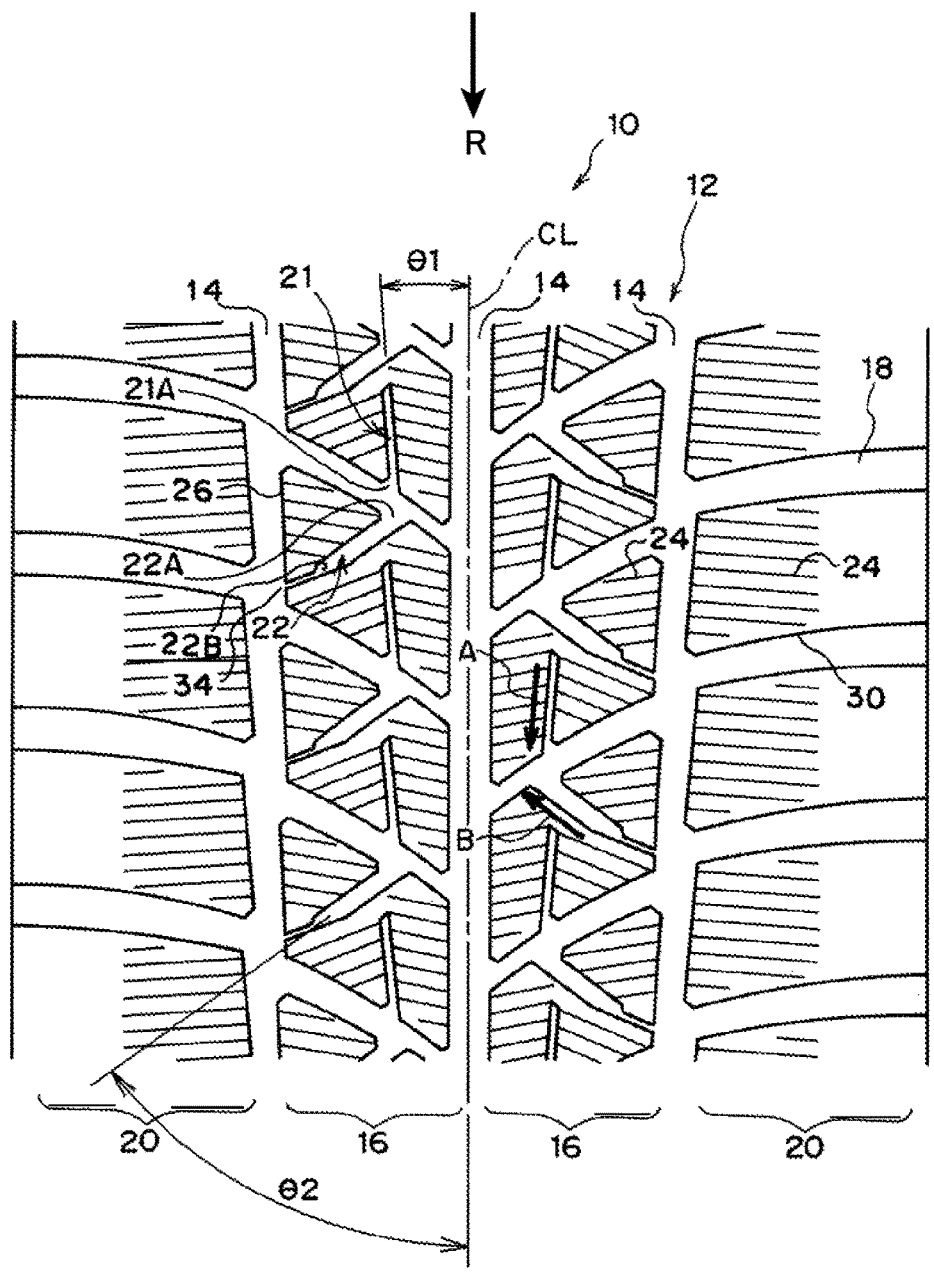
FIG. 1 is a plan view illustrating a tread pattern of a pneumatic tire according to an exemplary embodiment.

Explanation follows regarding an exemplary embodiment of the present invention, with reference to the drawings. FIG. 1 illustrates a pneumatic tire 10 of the present exemplary embodiment with a tread 12 that is a tread face portion and includes plural circumferential direction main grooves 14, central land portion rows 16 that are examples of land portion rows, lug grooves 18, first auxiliary grooves 21, and second auxiliary grooves 22. The pneumatic tire 10 has a stipulated rotation direction R. The first auxiliary grooves 21 are positioned towards the rotation direction R rear, and the second auxiliary grooves 22 are positioned towards the rotation direction R front.

A total of 3 of the circumferential direction main grooves 14 are formed extending along the tire circumferential direction, with for example one circumferential direction main groove 14 positioned so as to include a tire equatorial plane CL, and a further circumferential direction main groove 14 on each side of the tire equatorial plane CL.

Plural of the central land portion rows 16 are formed, the central land portion rows 16 being partitioned by the plural circumferential direction main grooves 14. In the present exemplary embodiment, one of the central land portion rows 16 are formed on each side of the tire equatorial plane CL, partitioned by the 3 circumferential direction main grooves 14. Shoulder land portion rows 20 are respectively formed further to the tire width direction outsides of the circumferential direction main grooves 14 on each side of the tire equatorial plane CL.

The lug grooves 18 are grooves that partition for example the central land portion rows 16 and the shoulder land portion rows 20 into plural land portions 26, 30 in rows along the tire circumferential direction. The lug grooves 18 are for example formed alternately on one side and then the other side of the tire equatorial plane CL along the tire circumferential direction.

Each of the lug grooves 18 for example crosses over the central land portion rows 16 and the shoulder land portion rows 20 in an inclined state with respect to the tire width direction. In consideration of for example water discharge performance on a wet road surface, the angle of inclination of the lug grooves 18 at the central land portion rows 16 is set larger than the angle of inclination at the shoulder land portion rows 20. The land portions 26, 30 are formed with sipes 24 as appropriate. The shape and number of the sipes 24 is not limited to the example illustrated and may be set as appropriate.

The first auxiliary grooves 21 are formed on one groove width direction side of the lug grooves 18. The first auxiliary grooves 21 open onto the lug grooves 18, and terminate inside the land portions 26. The first auxiliary grooves 21 are for example formed in a straight line shape. An incline θ1 of the first auxiliary grooves 21 forms an acute angle of less than 30 degrees with respect to the tire equatorial plane CL. Note that the incline of the first auxiliary grooves 21 with respect to the tire equatorial plane CL is configured as an acute angle of less than 30 degrees since above this value, the edge effect with respect to tire equatorial-orthogonal direction input that occurs during turning becomes insufficient.

The second auxiliary grooves 22 are formed on the other width direction side of the lug grooves 18. The second auxiliary grooves 22 open onto the lug grooves 18 so as to face opening portions 21A of the first auxiliary grooves 21 that open onto the lug grooves 18, and terminate inside the land portions 26. Specifically, opening portions 22A of the second auxiliary grooves 22 onto the lug grooves 18 and the opening portions 21A of the first auxiliary grooves 21 onto the lug grooves 18 face each other along the tire circumferential direction at specific positions in the tire width direction.

Note that terminal portions 22B that are opposite side end portions of the opening portions 22A of the second auxiliary grooves 22 are positioned inside the land portions 26. The terminal portions 22B are however connected to the circumferential direction main grooves 14 adjacent on the tire width direction outsides of the central land portion rows 16 through for example fine grooves 34. Due to providing the fine grooves 34, water discharge performance is raised, whilst suppressing snow (not illustrated in the drawings) inside the second auxiliary grooves 22 from escaping into the circumferential direction main grooves 14.

The second auxiliary grooves 22 are for example formed in a straight line shape. An incline θ2 of the second auxiliary grooves 22 forms an acute angle of 30 degrees or greater with respect to the tire equatorial plane CL. Note that the incline of the second auxiliary grooves 22 with respect to the tire equatorial plane CL is configured as an acute angle of 30 degrees or greater since below this value, an edge effect with respect to input along the tire equatorial direction that occurs during braking and during acceleration becomes insufficient.

Note that in the example illustrated in the drawings, the groove width of the second auxiliary grooves 22 is shown wider than the groove width of the first auxiliary grooves 21, however there is no limitation thereto, and the groove width of the of the first auxiliary grooves 21 may be configured the same as or greater than the groove width of the second auxiliary grooves 22.

Note that there is no limitation to 3 of the circumferential direction main grooves 14, and configuration may be made with 2, or 4 or more, of the circumferential direction main grooves 14. Moreover, the incline θ1 of the first auxiliary grooves 21 and the incline θ2 of the second auxiliary grooves 22 with respect to the tire equatorial plane CL are illustrated within the value ranges described above, however configuration outside of these value ranges is also possible.

Operation

Explanation follows regarding operation of the present exemplary embodiment configured as described above. As illustrated in FIG. 1, the tread 12 of the pneumatic tire 10 of the present exemplary embodiment includes the first auxiliary grooves 21 that are formed on the one groove width direction side of the lug grooves 18 so as to open onto the lug grooves 18 and terminate inside the land portions 26, and the second auxiliary grooves 22 that are formed on the other groove width direction side of the lug grooves 18 so as to open onto the lug grooves 18 facing the opening portions 21A of the first auxiliary grooves 21 onto the lug grooves 18, and terminate inside the land portions 26. Accordingly, in addition to the edge effect of the first auxiliary grooves 21 and the second auxiliary grooves 22, snow (not illustrated in the drawings) that has been pushed out from the first auxiliary grooves 21 and the second auxiliary grooves 22 into the lug grooves 18 in the arrow A and arrow B directions is pushed together and compacted in the vicinity of the lug groove 18 opening portions 21A, 22A of the first auxiliary grooves 21 and the second auxiliary grooves 22. Shear force from snow columns is accordingly increased, thereby enabling enhanced traction performance on snowy road surfaces.

In particular, due to appropriately setting the angle of inclination inclines θ1, θ2 of the first auxiliary grooves 21 and the second auxiliary grooves 22 that form acute angles with respect to the tire equatorial plane CL, handling stability performance, as well as an edge effect during braking and acceleration, can be obtained when running over snowy road surfaces. Running performance over snowy road surfaces can accordingly be further enhanced.

By respectively configuring the lug grooves 18, the first auxiliary grooves 21 and the second auxiliary grooves 22 at different angles to each other, an edge effect can be realized that accommodates changes in the input to the tire during turning, enabling a drop in braking performance and handling stability performance on dry road surfaces and icy road surfaces to be suppressed.

Test Example

Figure 2:
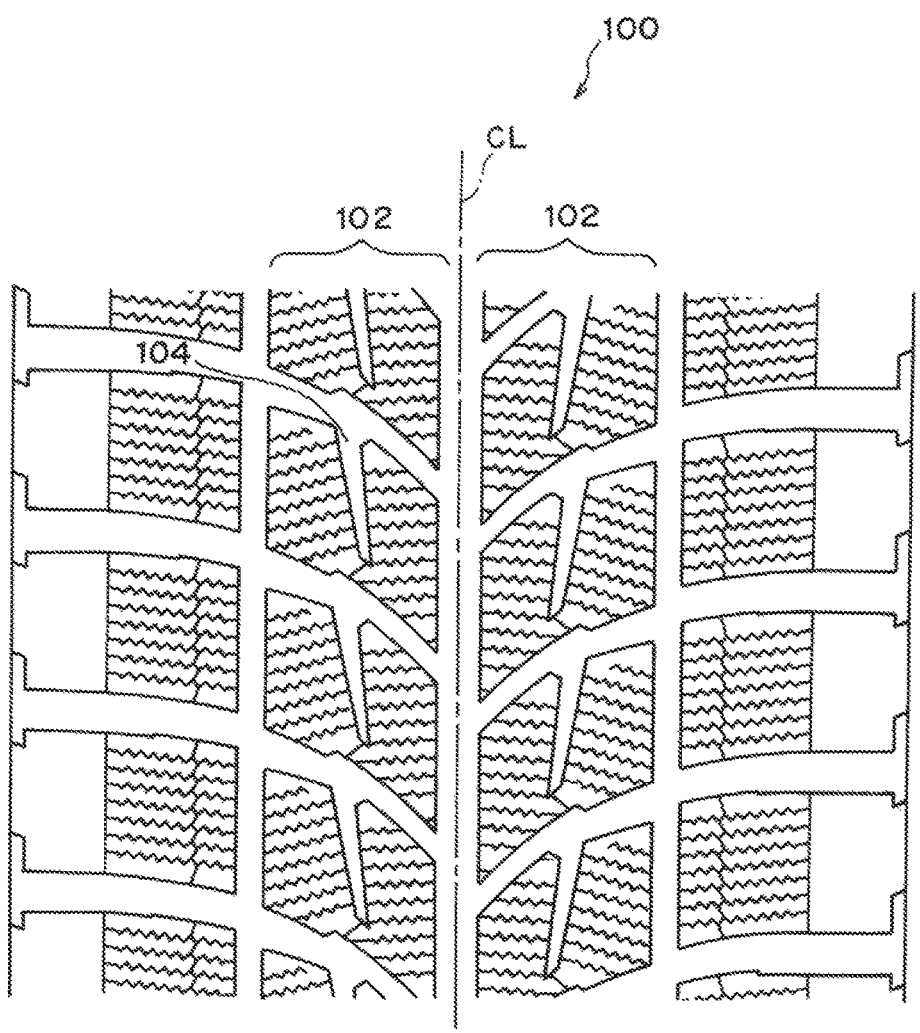
FIG. 2 is a plan view illustrating a tread pattern of a pneumatic tire according to a conventional example.

Testing is performed for the various evaluation criteria shown in Table 2 on the pneumatic tire 10 of a Test Example having the tread pattern illustrated in FIG. 1 including first auxiliary grooves and second auxiliary grooves configured as set out in Table 1, and on a conventional pneumatic tire 100 of the tread pattern illustrated in FIG. 2, that includes auxiliary grooves configured as set out in Table 1. The tire size is 195/65R15 (tread width 162 mm), internal pressure is 220 kPa, and load corresponds to two occupants. Note that in FIG. 2, 102 is a land portion row and 104 is an auxiliary groove.

Brief explanation follows regarding the evaluation methods employed for each of the evaluation criteria set out in Table 2.

Wet Road Surface

Hydroplaning is evaluated by a test driver feeling the hydroplaning occurrence threshold speed when running on a straight wet road surface with a water depth of 5 mm. Braking performance is evaluated by the braking distance for the vehicle to come to a standstill when the brakes are fully applied in a state running at 80 km/h on a straight wet road surface with a water depth of 2 mm.

Dry Road Surface

Braking performance is evaluated by the braking distance for the vehicle to come to a standstill when the brakes are fully applied in a state running at 80 km/h on a dry road surface. Handling stability performance is evaluated by a test driver feeling for various running modes when sports running on a circuit course in a dry state.

Snowy Road Surface

Traction performance is evaluated by the time required to accelerate from 10 km/h to 45 km/h on a snowy road surface. Braking performance is evaluated by the braking distance for the vehicle to come to a standstill when the brakes are fully applied in a state running at 40 km/h on a snowy road surface.

Handling stability performance is evaluated by overall test driver feeling for braking performance, start-up performance, straight ahead running performance, and cornering performance on a test course with a compacted snow road surface.

Icy Road Surface

Traction performance is evaluated by the time required to accelerate from a standstill to 20 km/h on an icy road surface.

Braking performance is evaluated by the braking distance for the vehicle to come to a standstill when the brakes are fully applied in a state running at 20 km/h on an icy road surface.

Handling stability performance is evaluated by overall test driver feeling for braking performance, start-up performance, straight ahead running performance, and cornering performance on a test course with a frozen road surface.

The results illustrated in Table 2 are shown employing an index wherein the Conventional Example is given a value of 100 for each of the evaluation criteria, wherein the higher the value, the better the result. As illustrated in Table 2, the tire of the Test Example outperforms the tire of the Conventional Example in each of the evaluation criteria. It can be confirmed that the tire of the Test Example enhances snow performance whilst maintaining braking performance and handling stability performance on wet road surfaces, dry road surfaces, and icy road surfaces.

TABLE 1

|  |  | Width (mm) | Groove Angle (°) | Groove depth (mm) |
|---|---|---|---|---|
| Test Example | First auxiliary groove | 4.5 | 25 | 8 |
|  | Second auxiliary groove | 2 | 75 | 7 |
| Conventional Example | Auxiliary Groove | 2.5 to 5 | 81 | 7 |

TABLE 2

|  |  | Conventional Example | Test Example |
|---|---|---|---|
| Wet Road Surface | Hydroplaning (straight line) | 100 | 100 |
|  | Braking performance (straight line) | 100 | 100 |
|  | Handling stability performance | 100 | 100 |
| Dry Road Surface | Braking performance (straight line) | 100 | 100 |
|  | Handling stability performance | 100 | 100 |
| Snowy Road Surface | Traction performance | 100 | 115 |
|  | Braking performance | 100 | 115 |
|  | Handling stability performance | 100 | 110 |
| Icy Road Surface | Traction performance | 100 | 105 |
|  | Braking performance | 100 | 105 |
|  | Handling stability performance | 100 | 100 |

EXPLANATION OF THE REFERENCE NUMERALS 10 pneumatic tire
12 tread
14 circumferential direction main groove
16 central land portion row (land portion row)
18 lug groove 21 first auxiliary groove
21A opening portion
22 second auxiliary groove
CL tire equatorial plane
R rotation direction

The invention claimed is:

1. A pneumatic tire with a tread, the tread comprising:
   a plurality of circumferential direction main grooves extending along a tire circumferential direction;
   a plurality of land portion rows that are partitioned by the circumferential direction main grooves and that are formed with sipes;
   lug grooves that partition each land portion row into a plurality of land portions in a row along the tire circumferential direction;
   first auxiliary grooves formed on one groove width direction side of the lug grooves, the first auxiliary grooves opening onto the lug grooves and terminating inside the land portions; and
   second auxiliary grooves formed on the other groove width direction side of the lug grooves, the second auxiliary grooves opening onto the lug grooves so as to face opening portions of the first auxiliary grooves that open onto the lug grooves, and terminating inside the land portions, and
   terminal portions of the second auxiliary grooves being connected to the circumferential direction main grooves through fine grooves of which groove width is wider than that of the sipes,
   wherein the terminal portions of the second auxiliary grooves bend toward a tire edge from an extending direction of the second auxiliary grooves, and
   the fine grooves are formed on an extension of a bending direction of the terminal portions of the second auxiliary grooves.

2. The pneumatic tire of claim 1, wherein an incline of the first auxiliary grooves forms an acute angle of less than 30 degrees with respect to a tire equatorial plane, and an incline of the second auxiliary grooves forms an acute angle of 30 degrees or greater with respect to the tire equatorial plane.

3. The pneumatic tire of claim 1, wherein:
   a rotation direction of the pneumatic tire is stipulated;
   the first auxiliary grooves are positioned towards the rotation direction rear; and
   the second auxiliary grooves are positioned towards the rotation direction front.

4. The pneumatic tire of claim 1, wherein a groove width of the second auxiliary grooves is greater than a groove width of the first auxiliary grooves.

5. The pneumatic tire of claim 3, wherein a groove width of the second auxiliary grooves is greater than a groove width of the first auxiliary grooves.

* * * * *